(12) United States Patent
Uragami et al.

(10) Patent No.: US 9,900,567 B2
(45) Date of Patent: Feb. 20, 2018

(54) IMAGE DISPLAY DEVICE

(71) Applicant: Panasonic Intellectual Property Management Co., Ltd., Osaka (JP)

(72) Inventors: Susumu Uragami, Osaka (JP); Hiroyuki Furuya, Osaka (JP); Takahisa Shiramizu, Saga (JP); Akira Kurozuka, Osaka (JP); Yuta Yamamoto, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/426,041

(22) Filed: Feb. 6, 2017

(65) Prior Publication Data

US 2017/0264872 A1    Sep. 14, 2017

(30) Foreign Application Priority Data

Mar. 14, 2016  (JP) ................................ 2016-049290
Mar. 14, 2016  (JP) ................................ 2016-049291

(51) Int. Cl.
*H04N 9/31*     (2006.01)
*G02B 27/01*    (2006.01)

(52) U.S. Cl.
CPC .......... *H04N 9/3185* (2013.01); *G02B 27/01* (2013.01)

(58) Field of Classification Search
CPC ............................ H04N 9/3185; G02B 27/01
See application file for complete search history.

(56) References Cited

U.S. PATENT DOCUMENTS

2009/0160736 A1    6/2009  Shikita
2016/0161833 A1*   6/2016  Watanabe .............. B60K 35/00
                                                 345/7

FOREIGN PATENT DOCUMENTS

JP     2009-150947     7/2009

* cited by examiner

*Primary Examiner* — Michael Teitelbaum
(74) *Attorney, Agent, or Firm* — McDermott Will & Emery LLP

(57) ABSTRACT

An image display device includes a light source, a screen, an optical system, a screen driving mechanism unit, a memory unit, and a screen driving circuit unit. An image is formed on the screen by being irradiated with light from the light source. The screen driving mechanism unit moves the screen in an optical axis direction of the light. A smoothed movement profile is obtained by smoothing a movement profile used as a target for moving the screen so as to make a moving speed of the screen vary gently. The memory unit stores screen driving waveform information that has been generated so that the screen follows the smoothed movement profile. The screen driving circuit unit drives the screen driving mechanism unit, based on the screen driving waveform information stored in the memory unit.

8 Claims, 16 Drawing Sheets

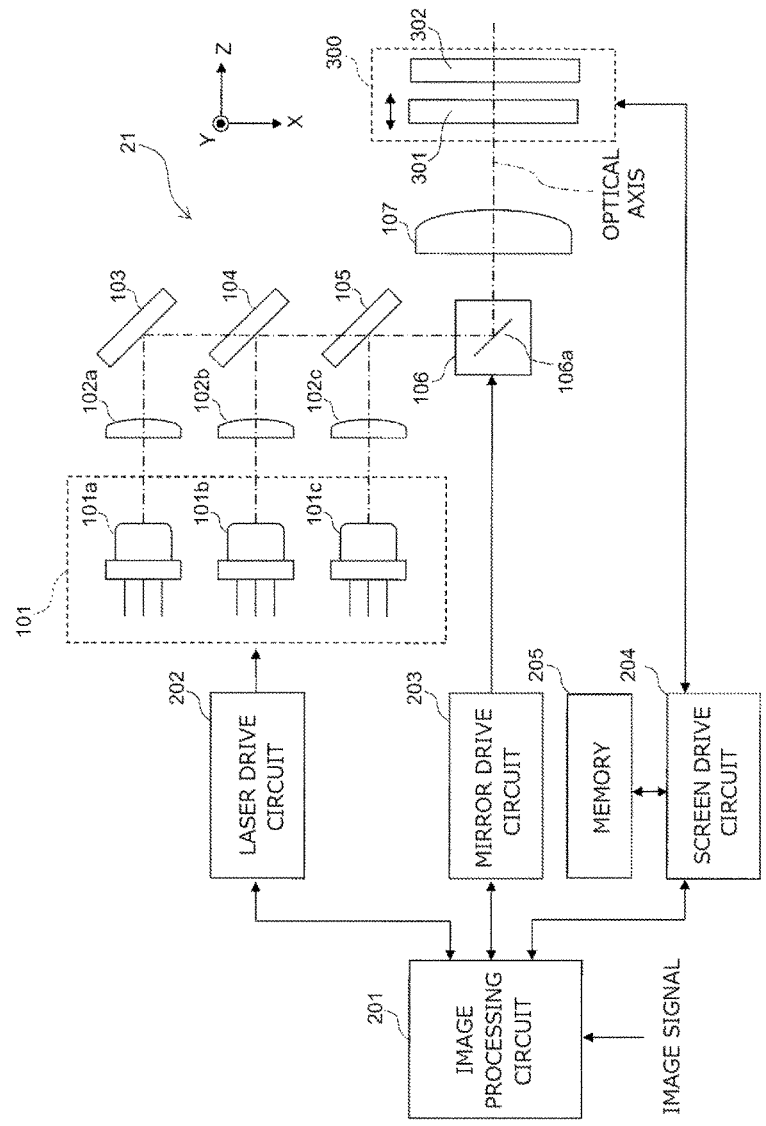

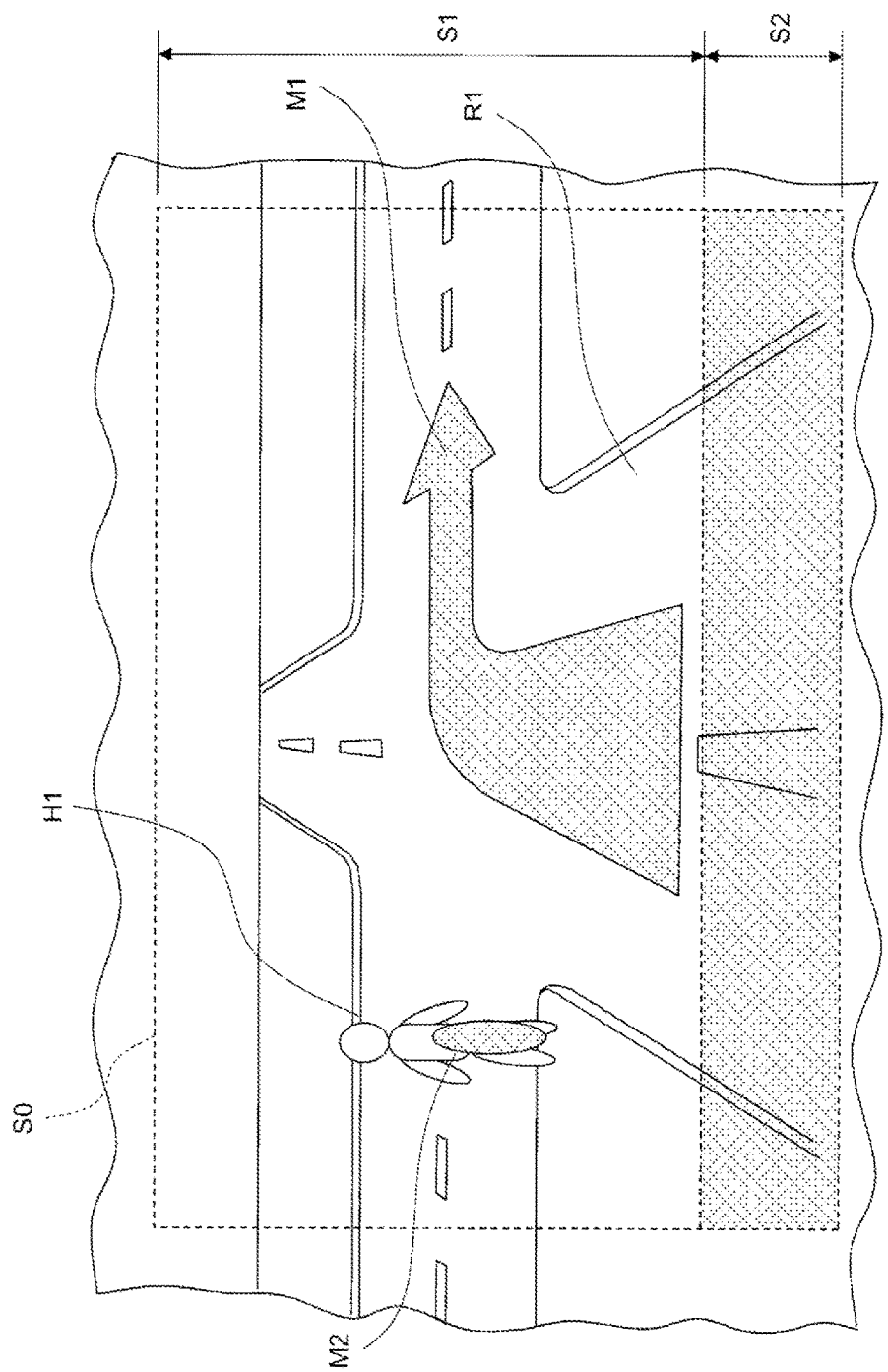

IMAGE DISPLAY DEVICE

BACKGROUND

1. Technical Field

The present disclosure relates to an image display device adapted to be mounted in vehicles and other movable bodies, for example.

2. Description of the Related Art

In recent years, image display devices, called head-up displays, have been developed. Such image display devices are adapted to be mounted in vehicles or other movable bodies. When a head-up display is mounted in a vehicle, the head-up display modulates light based on image information and irradiates a windshield with the modulated light. Then, the light is reflected by the windshield and incident on the vehicle driver's eyes. This enables the vehicle driver to see a virtual image based on the image information in front of the windshield. For example, a vehicle speed or an ambient temperature can be displayed as a virtual image. Studies are currently being conducted to display, as virtual images, a navigation image and an image for calling vehicle driver's attention to passengers, for example.

Some head-up displays, as described above, are equipped with a laser light source including a semiconductor laser, as a light source used to generate a virtual image. This configuration scans a screen with a laser light beam modulated with an image signal. Then, the laser light beam is diffused on the screen whereby the vehicle driver's eyes are irradiated with the light incident from a wider area. This prevents the vehicle driver's eyes from leaving the irradiated area even if he or she moves the head to some degree. Consequently, the vehicle driver can see the image (virtual image) appropriately and stably.

Unexamined Japanese Patent Publication No. 2009-150947 discloses an exemplary configuration that causes a screen to move along an optical axis, displacing an imaging site of a virtual image in the front-back directions. This configuration includes a motor, a feed screw, and a rack in order to move the screen.

SUMMARY

An image display device in a first aspect of the present disclosure includes a light source, a screen, an optical system, a screen driving mechanism unit, a memory unit, and a screen driving circuit unit. An image is formed on the screen by being irradiated with light from the light source. The optical system generates a virtual image with the light from the screen. The screen driving mechanism unit moves the screen in an optical axis direction of the light emitted from the light source. A smoothed movement profile is obtained by smoothing a movement profile used as a target for moving the screen so as to make a moving speed of the screen vary gently. The memory unit stores screen driving waveform information that has been generated so that the screen follows the smoothed movement profile. The screen driving circuit unit drives the screen driving mechanism unit, based on the screen driving waveform information stored in the memory unit.

According to the first aspect of the present disclosure, the smoothed movement profile is obtained by smoothing the movement profile used as a target for moving the screen so as to make a moving speed of the screen vary gently. The screen driving waveform information that has been generated so that the screen follows the smoothed movement profile is stored in the memory unit. The screen driving circuit unit drives the screen driving mechanism unit, based on the screen driving waveform information stored in the memory unit. Thus, drive current or drive voltage for driving the screen can be reduced. Accordingly, the image display device in the first aspect can control a movement of the screen with stability. The stability can be improved, especially when the screen transits from a motion state to a stop state or from a stop state to a motion state.

An image display device in a second aspect of the present disclosure includes a light source, a screen, an optical system, a screen driving mechanism unit, a memory unit, and a screen driving circuit unit. An image is formed on the screen by being irradiated with light from the light source. The optical system generates a virtual image with the light from the screen. The screen driving mechanism unit moves the screen in an optical axis direction of the light emitted from the light source. The memory unit stores screen driving waveform information that has been generated so that the screen follows a movement profile used as a target for moving the screen. The screen driving circuit unit drives the screen driving mechanism unit, based on the screen driving waveform information stored in the memory unit. The screen driving waveform information is generated, based on a motional property of the screen driving mechanism unit.

According to the second aspect of the present disclosure, the screen driving waveform information is obtained so that the screen follows the movement profile used as a target for moving the screen and stored in the memory unit. The screen driving mechanism unit is driven based on the screen driving waveform information stored in the memory unit. With this configuration, an actual movement of the screen accurately following to target values of the movement profile can be realized. Further, the screen driving waveform information, based on which the screen driving mechanism unit is driven, is generated in consideration of motional property that differs according to a structure of the screen driving mechanism unit. Thus, an actual movement of the screen can be approximated to target values of the movement profile in a short time. Thus, the image display device in the second aspect can make an actual movement of the screen in the optical axis direction of the light emitted from the light source to accurately follow target values of the movement profile in a short time.

An effect and significance of the present disclosure will be apparent from exemplary embodiments described below. It should be understood that exemplary embodiments described below are examples for use in implementing the present disclosure and thus not intended to limit the present disclosure.

BRIEF DESCRIPTION OF THE DRAWINGS

FIG. 2 is a diagram illustrating a configuration of an illumination light generator in the image display device according to the first exemplary embodiment and a configuration of a circuit for the illumination light generator;

FIG. 6 is a schematic view illustrating an image display example according to the first exemplary embodiment;

DETAILED DESCRIPTION OF EMBODIMENT

Figure 1A:
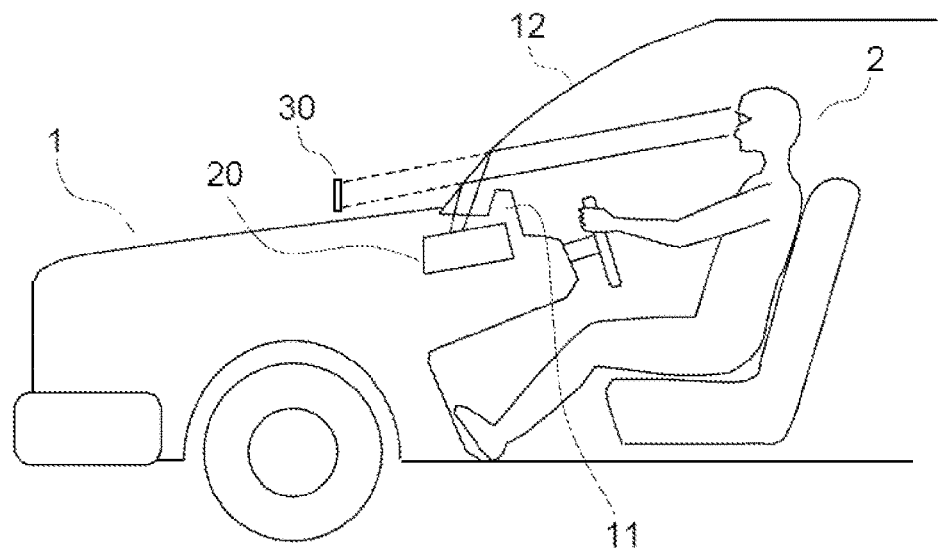
FIG. 1A is a schematic view illustrating a use mode of an image display device according to a first exemplary embodiment of the present disclosure.

First of all, problems with a configuration of conventional image display devices will be described prior to the exemplary embodiments of the present disclosure. A conventional image display device forms a series of images on a screen while moving the position of the screen along an optical axis at a high speed. As a result of this, a vehicle driver visually perceives the displayed images as a single image that spreads out into its depth (referred to below as a "depth image"). In turn, the image display device stops the screen at a predetermined location and then forms an image on this stationary screen. As a result of this, the vehicle driver visually perceives the displayed image as an image present at a predetermined site in a depth direction (referred to below as a "standing image"). In this way, a conventional image display device displays both a standing image and a depth image in an overlapping manner. Therefore, for example, the image display device can display an image (depth image) of an arrow indicating a moving direction of the vehicle which overlaps an image (standing image) of an intersection, or can display an image (depth image) intended to call for attention which overlaps an image (standing image) of an obstacle present in front of the intersection. To cause the vehicle driver to visually perceive a depth image and a standing image present at a fixed distance as a single image, the image display device needs to both move the screen at a high speed and stop it.

Unfortunately, if a screen reciprocates at a high speed, the screen needs to transit rapidly from a stop state to a motion state or from a motion state to a stop state on both sides of its moving range. This rapid transition of the screen on both sides of the moving range may require a large amount of drive current. This might result in an unstable control of the movement of the screen.

A first aspect of the present disclosure, which addresses the above disadvantage, is to provide an image display device capable of controlling a movement of the screen with stability even when a screen moves at a high speed.

On the other hand, some conventional image display devices control, in an open-loop manner, a screen driving mechanism that moves a movable screen at a high speed or stops it. To make an actual movement of the screen to follow target values of a movement profile, a manufacturer needs to manually adjust the number of drive pulses and a moving direction of a screen during the fabrication while monitoring both a location of the screen and an operation of a screen driving circuit which drives the screen driving mechanism.

However, it may be difficult to make an actual movement of a screen to accurately follow target values of a movement profile.

A second aspect of the present disclosure, which addresses the above disadvantage, is to provide an image display device capable of making an actual movement of a screen in an optical axis direction of light emitted from a light source to accurately follow target values of a movement profile.

An image display device in a first aspect of the present disclosure includes a light source, a screen, an optical system, and a screen driving mechanism unit. The light source irradiates the screen with light, forming an image on the screen. The optical system generates a virtual image with the light from the screen. The screen driving mechanism unit moves the screen in an optical axis direction of the light emitted from the light source. Furthermore, the image display device includes a memory unit and a screen driving circuit unit. Screen driving waveform information is stored in a memory unit. The screen driving waveform information is generated such that the screen follows a smoothed movement profile. The smoothed movement profile is obtained by smoothing a movement profile so as to make a moving speed of the screen vary gently (not rapidly). The movement profile is used as a target for moving the screen. The screen driving circuit unit drives the screen driving mechanism unit, based on the screen driving waveform information stored in the memory unit. With this configuration, the screen driving waveform information is stored in the memory unit. The screen driving waveform information is generated such that the screen follows the smoothed movement profile that has been obtained by smoothing the movement profile used as a target for moving the screen so as to make a moving speed of the screen vary gently. In addition, based on the screen driving waveform information stored in the memory unit, the screen driving mechanism unit is driven. This configuration enables the driving of the screen with a low drive voltage. Also, the configuration enables the control of a movement of the screen with stability. This control can be very stable, especially when the screen transits from a motion state to a stop state or from a stop state to a motion state.

The smoothed movement profile may be obtained by smoothing the movement profile with a simple moving average method or a weighted moving average method. By smoothing the movement profile with a simple moving average method or a weighted moving average method, the smoothed movement profile can be generated with ease.

The screen driving waveform information may be current waveform information of a screen drive for use in driving the screen. The screen driving circuit unit thereby can control a driving of the screen driving mechanism unit with ease.

The screen driving waveform information may be voltage waveform information of a screen drive for use in driving the screen. The screen driving circuit unit thereby can control driving of the screen driving mechanism unit with ease.

The screen driving mechanism unit includes: a holder unit that holds the screen; a magnetic coil unit supported by the holder unit; and a suspension unit that supports the holder unit so as to enable the holder unit to move in the optical axis direction. With this configuration, the screen driving mechanism unit can be constituted by a minimal number of constituent elements. The screen driving circuit unit thereby can control the screen driving mechanism unit with ease.

An image display device in a second aspect of the present disclosure includes a light source, a screen, an optical system, a screen driving mechanism unit, and a memory unit. The light source irradiates the screen with light, forming an image on the screen. The optical system generates a virtual image with the light from the screen. The screen driving mechanism unit moves the screen in an optical axis direction of the light emitted from the light source. Screen driving waveform information is stored in the memory unit. The screen driving waveform information is generated such that the screen follows a movement profile used as a target for moving the screen. Furthermore, the image display device includes a screen driving circuit unit that drives the screen driving mechanism unit, based on the screen driving waveform information stored in the memory unit. The screen driving waveform information is generated based on a motional property of the screen driving mechanism unit. With this configuration, the screen driving waveform information can be generated in consideration of motional property that differs according to a structure of individual screen driving mechanism unit. This makes it possible to make an actual movement of the screen to accurately follow target values of the movement profile. In addition, by driving the screen driving mechanism unit, based on the screen driving waveform information that has been preset in consideration of motional property that differs according to a structure of individual screen driving mechanism unit, an actual movement of the screen can be approximated to target values of the movement profile in a short time. Thus, the image display device in the second aspect successfully makes an actual movement of the screen in the optical axis direction of the light emitted from the light source to accurately follow target values of the movement profile in a short time.

The screen driving waveform information may be current waveform information of a screen drive for use in driving the screen. This can help the screen driving circuit unit to control driving of the screen driving mechanism unit.

The screen driving waveform information may be voltage waveform information of a screen drive for use in driving the screen. This can help the screen driving circuit unit to control driving of the screen driving mechanism unit.

The screen driving mechanism unit includes: a holder unit that holds the screen; a magnetic coil unit supported by the holder unit; and a suspension unit that supports the holder unit so as to enable the holder unit to move in the optical axis direction. With this configuration, the screen driving mechanism unit can be constituted by a minimal number of constituent elements, thus helping the screen driving circuit unit to control driving of the screen driving mechanism unit.

First Exemplary Embodiment

A first exemplary embodiment will be described below with reference to the accompanying drawings. In each drawing, the X, Y, and Z axes orthogonal to one another are described for the sake of explanation. In this exemplary embodiment, the present disclosure is applied to an on-board head-up display.

Figure 1B:
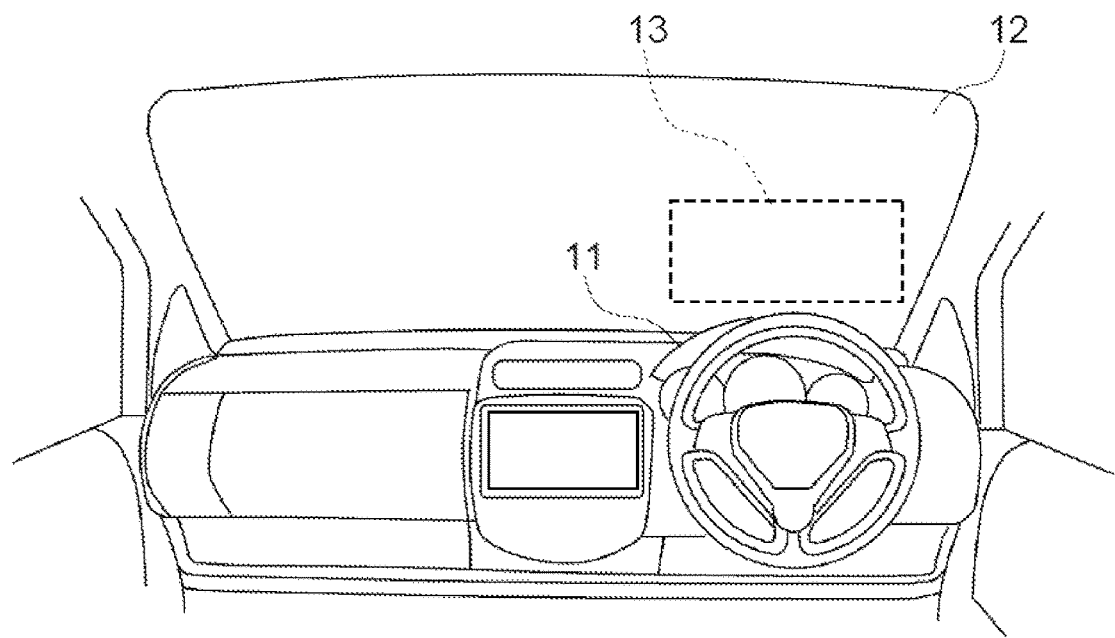
FIG. 1B is another schematic view illustrating the use mode of the image display device according to the first exemplary embodiment.

FIGS. 1A and 1B each schematically illustrate a use mode of image display device 20. More specifically, FIG. 1A schematically illustrates the interior of vehicle 1 as seen from one side, and FIG. 1B schematically illustrates the front side of the interior of vehicle 1 in a running direction.

As illustrated in FIG. 1A, image display device 20 is mounted in dashboard 11 of vehicle 1.

As illustrated in FIGS. 1A and 1B, image display device 20 irradiates projection area 13, which is a lower part of windshield 12 near the vehicle driver seat, with laser light modulated with a image signal. Then, the laser light is reflected on projection area 13 and incident on a horizontally long region (eye box region) in the vicinity of the eyes of vehicle driver 2. As a result, predetermined image 30 appears within the field of front view of vehicle driver 2 as a virtual image. This enables vehicle driver 2 to see image 30, or the virtual image, that overlaps scenery in front of windshield 12. In short, image display device 20 generates image 30, or the virtual image, within a space in front of projection area 13 of windshield 12.

Figure 1C:
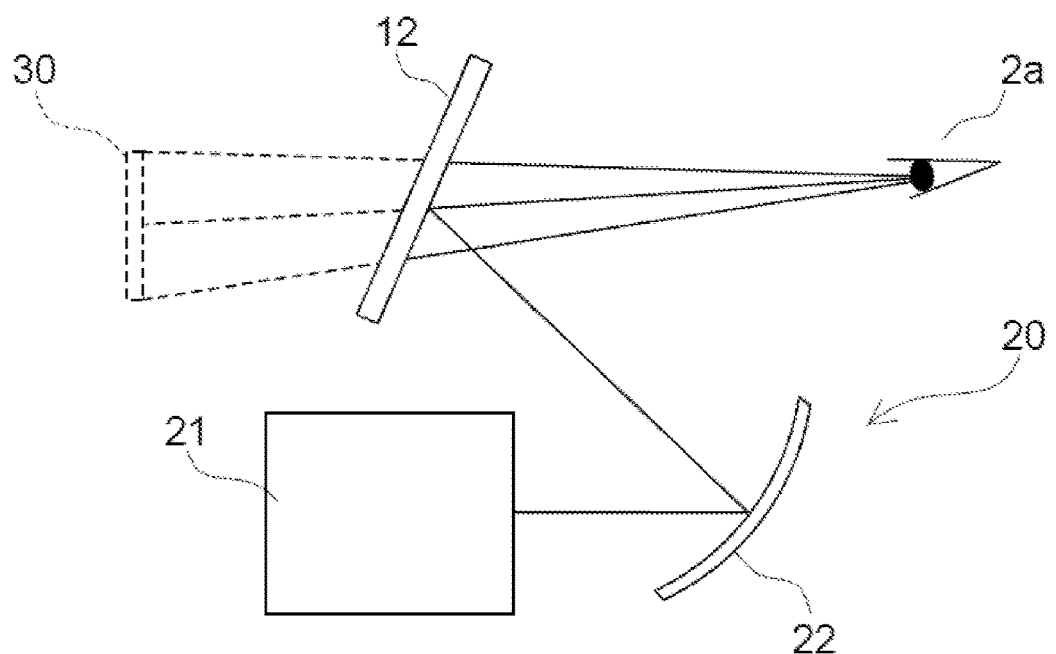
FIG. 1C is a schematic view illustrating a configuration of the image display device according to the first exemplary embodiment.

FIG. 1C schematically illustrates a configuration of image display device 20.

Image display device 20 includes illumination light generator 21 and mirror 22. Illumination light generator 21 emits laser light modulated with a image signal. Mirror 22 has a curved reflective surface, and this reflective surface reflects the laser light emitted from illumination light generator 21 to windshield 12. Then, the laser light is reflected by windshield 12 and incident on eyes 2a of vehicle driver 2. The optical system in illumination light generator 21 and mirror 22 are designed such that image 30, or the virtual image, having a predetermined size appears in front of windshield 12.

FIG. 2 illustrates a configuration of illumination light generator 21 in image display device 20 and a configuration of a circuit for illumination light generator 21.

Illumination light generator 21 includes light source 101, collimator lenses 102a, 102b, 102c, mirror 103, dichroic mirrors 104, 105, scanning unit 106, correcting lens 107, movable screen 301, fixed screen 302, and screen driving mechanism 300.

Light source 101 includes three laser light sources 101a, 101b, 101c. Laser light source 101a emits laser light in a blue wavelength band; laser light source 101b emits laser light in a green wavelength band; and laser light source 101c emits laser light in a red wavelength band. In this exemplary embodiment, light source 101 is provided with three laser light sources 101a, 101b, 101c in order to display a color image as image 30. However, if image display device 20 displays a monochrome image as image 30, light source 101 may be provided with a single laser light source corresponding to the color of the image. Each of laser light sources 101a, 101b, 101c may include a semiconductor laser, for example.

The laser light emitted from laser light source 101a, 101b, 101c is converted into a substantially collimated light beam by collimator lens 102a, 102b, 102c, respectively. In addition, the laser light beam emitted from each of laser light sources 101a, 101b, 101c is reshaped into a circular or elliptic light beam having a predetermined aspect ratio by an unillustrated aperture. Alternatively, instead of collimator lens 102a, 102b, 102c, shaping lenses may be used to reshape laser lights into circular or elliptic light beams having a predetermined aspect ratio and convert the light beams into a collimated light beams. In this case, the aperture is unnecessary.

After the laser light beams of the predetermined colors have been emitted from laser light sources 101a, 101b, 101c, the optical axes of the respective laser light beams are aligned with one another by mirror 103 and two dichroic mirrors 104, 105. The blue laser light beam that has passed through collimator lens 102a is reflected almost totally by mirror 103. The green laser light beam that has passed through collimator lens 102b is reflected by dichroic mirror 104, whereas the blue laser light beam that has been reflected by mirror 103 passes through dichroic mirror 104. The red laser light beam that has passed through collimator lens 102c is reflected by dichroic mirror 105, whereas the blue laser light beam that has passed through dichroic mirror 104 and the green laser light beam that has been reflected by dichroic mirror 104 pass through dichroic mirror 105. Mirror 103 and two dichroic mirrors 104, 105 are disposed such that the optical axes of the laser light beams of the predetermined colors emitted from laser light sources 101a, 101b, 101c are aligned with one another.

The blue and green laser light beams that have passed through dichroic mirror 105 and the red laser light beam that has been reflected by dichroic mirror 105 are reflected by scanning unit 106. Scanning unit 106 may include a MEMS (Micro Electro Mechanical System) mirror, for example. More specifically, the blue and green laser light beams that have passed through dichroic mirror 105 and the red laser light beam that has been reflected by dichroic mirror 105 are incident on mirror 106a of scanning unit 106. Scanning unit 106 rotates mirror 106a around axes parallel to the X and Y axes in accordance with a drive signal. By rotating mirror 106a in this manner, a direction in which the laser light beams are reflected by scanning unit 106 can be varied within the X-Z plane and the Y-Z plane. In this way, scanning unit 106 scans movable screen 301 with the laser light beams of the predetermined colors, as described later.

In this exemplary embodiment, scanning unit 106 employs a biaxially driven MEMS mirror; however, scanning unit 106 may employ any other configurations. As one example, scanning unit 106 may employ a combination of a mirror that is driven to rotate around an axis parallel to the Y axis and a mirror that is driven to rotate around an axis parallel to the X axis.

Correcting lens 107 is designed such that the laser light beams of the predetermined colors travel in the positive direction along the Z axis, independently of an angle at which the laser light beams have been reflected by scanning unit 106. By scanning movable screen 301 and fixed screen 302 with the laser light beams, an image can be generated, and the laser light beams incident on movable screen 301 and fixed screen 302 are scattered within the surrounding region of eyes 2a (eye box region) of vehicle driver 2.

Movable screen 301 is caused by screen driving mechanism 300 to reciprocate in the directions parallel to the travel direction of the laser light beams (reciprocate along the Z-axis directions). However, fixed screen 302 is not moved by screen driving mechanism 300 and is fixed in screen driving mechanism 300 at a predetermined location.

Image processing circuit 201 includes an arithmetic processing unit, such as a CPU (Central Processing Unit), and a memory. When receiving a image signal, image processing circuit 201 processes this image signal, controlling laser driving circuit 202, mirror driving circuit 203, and screen driving circuit 204. Laser driving circuit 202 varies intensities of the laser lights emitted from laser light sources 101a, 101b, 101c, in accordance with a control signal received from image processing circuit 201. Mirror driving circuit 203 drives mirror 106a of scanning unit 106 in accordance with a control signal received from image processing circuit 201. Screen driving circuit 204 drives movable screen 301 in accordance with a control signal received from image processing circuit 201.

Memory 205 stores drive current profiles, from which a movement profile used as a target for moving movable screen 301 is to be generated. Each of these stored drive current profiles considers drive characteristics of screen driving mechanism 300 and is generated based on information obtained during fabrication of image display device 20. The drive current profiles are prepared and stored in memory 205 in order to determine at which sites depth image M1 and vertical image M2 are to be displayed, for example based on locations of pedestrian H1 and street R1 illustrated in FIG. 6. Then, from these drive current profiles, one is selected based on locations of pedestrian H1 and street R1. Screen driving circuit 204 drives screen driving mechanism 300 in conformity with this selected drive current profile.

Figure 3:
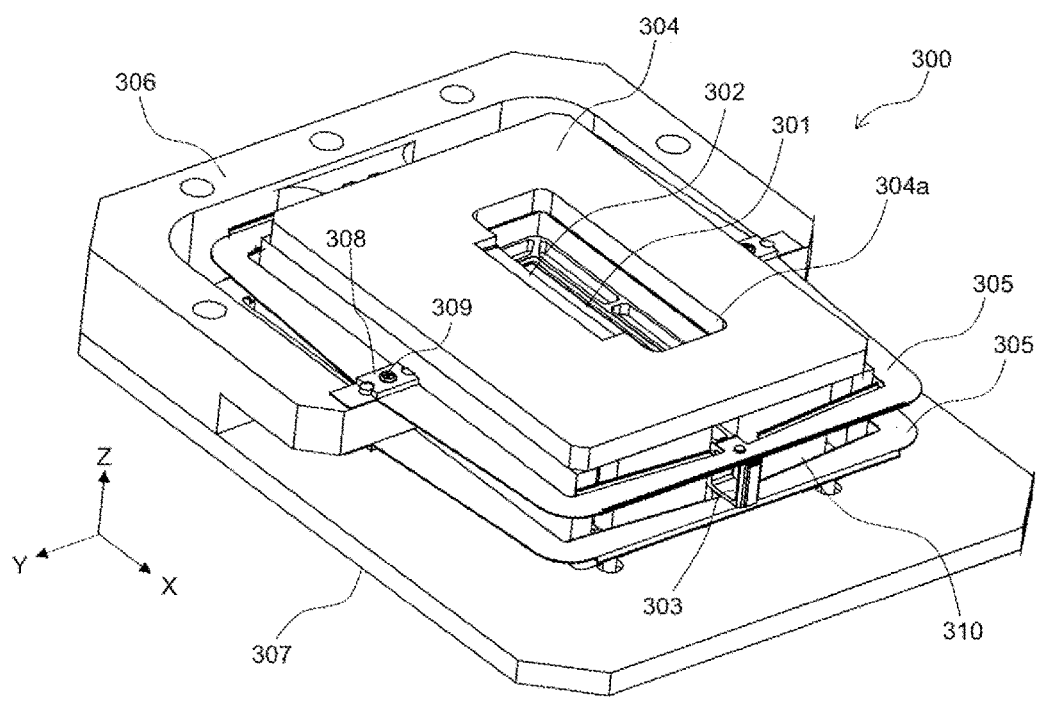
FIG. 3 is a perspective view illustrating a configuration of the screen driving mechanism unit according to the first exemplary embodiment.

FIG. 3 is a perspective view illustrating a configuration of screen driving mechanism 300. For the sake of explanation, individual directions are defined by X, Y, and Z axes in FIG. 3. In plan view, the side of screen driving mechanism 300 which is closer to its center is referred to as the inner side, whereas the side of screen driving mechanism 300 which is farther from the center is referred to as the outer side.

Screen driving mechanism 300 includes holder 303, cover 304, two suspensions 305, support member 306, base 307, washer 308, screw 309, and magnetic circuit 310. Holder 303 holds movable screen 301, and cover 304 holds fixed screen 302. Cover 304 has opening 304a via which movable screen 301 is exposed to the outside. Fixed screen 302 is disposed in opening 304a on the positive side of the Y axis.

Holder 303 is supported by suspensions 305 so as to be movable in both directions along the Z axis. Support member 306 is mounted on base 307 and suspensions 305 are fixed to support member 306 by washer 308 and screw 309. Magnetic circuit 310 is mounted on base 307. Holder 303 supports an unillustrated magnetic coil to which a magnetic field is applied from magnetic circuit 310. When an electric current flows through this magnetic coil, holder 303 moves in a direction along the Z axis.

Screen driving mechanism 300 may employ a typical moving-coil magnetic drive structure. Magnetic circuit 310 includes the unillustrated magnetic coil and a magnet. The combination of holder 303, the magnetic coil and movable screen 301 fixed to holder 303, and others constitute a moving part. This moving part is supported by suspensions 305 so as to be movable in both directions along the Z axis. This configuration helps screen driving circuit 204 to control screen driving mechanism 300, which is constituted by a minimal number of constituent elements.

Figure 4:
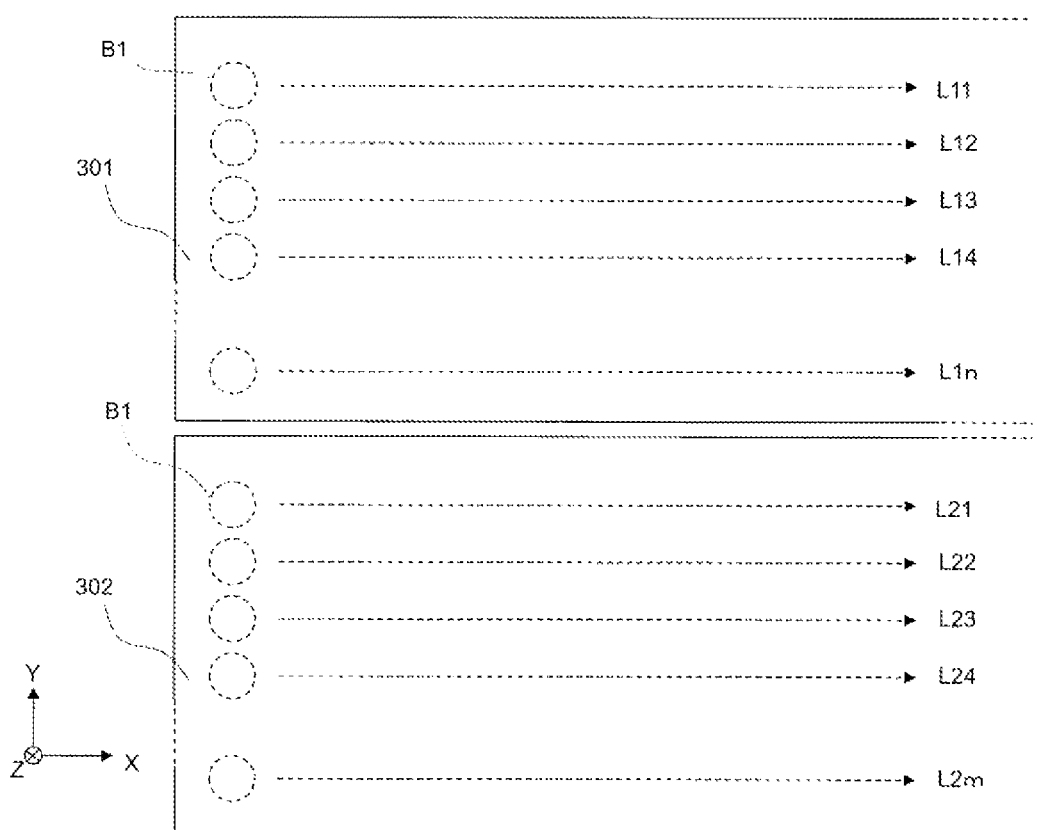
FIG. 4 is a schematic diagram illustrating a method for scanning a movable screen and a fixed screen according to the first exemplary embodiment with the laser light.

FIG. 4 schematically illustrates a method for scanning movable screen 301 and fixed screen 302 with laser light.

Movable screen 301 is sequentially scanned with light beam B1 in the positive direction along the X axis. In this case, light beam B1 is a combination of the individual colored laser lights. Scanning lines L11 to L1n to be irradiated with light beam B1 are formed on movable screen 301 in advance and arranged at regular intervals along the Y axis. Both ends of scanning lines L11 to L1n along the X axis are aligned with one another. Thus, scanning lines L11 to L1n are created within a rectangular area.

After movable screen 301 has been scanned in the above manner, fixed screen 302, which is disposed on the negative side of movable screen 301 along the Y axis, is scanned with light beam B1 in the positive direction along the X axis. Similar to scanning lines L11 to L1n, scanning lines L21 to L2m to be irradiated with light beam B1 are formed on fixed screen 302 in advance and arranged at regular intervals along the Y axis. Both ends of scanning lines L21 to L2m on the X axis are aligned with one another. Scanning lines L21 to L2m are created within a rectangular area.

Scanning lines L11 to L1n and L21 to L2m are scanned with light beam B1, which is generated from the predetermined colored laser lights modulated with the image signal. As a result of this scanning, images are generated on movable screen 301 and fixed screen 302. These images on movable screen 301 and fixed screen 302 are projected onto the region (eye box region) in the vicinity of eyes 2a of vehicle driver 2 through mirror 22 and windshield 12 (see FIG. 1C). Then, the images are visually perceived, by vehicle driver 2, as image 30, or a virtual image, in a space in front of windshield 12.

Figure 5A:
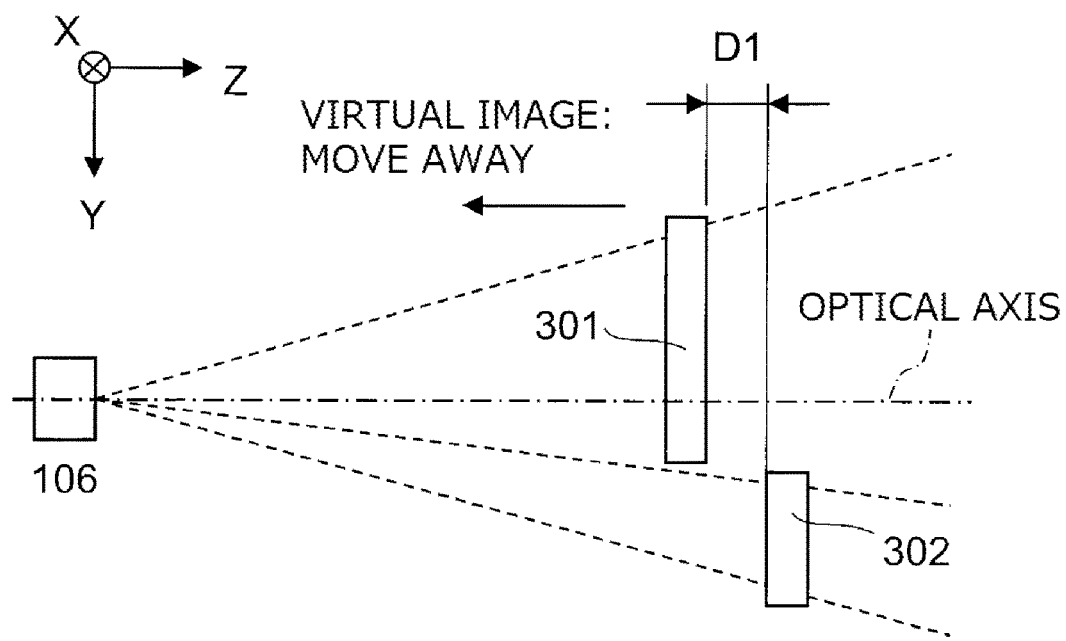
FIG. 5A is a schematic diagram illustrating a movable range of the movable screen according to the first exemplary embodiment.
Figure 5B:
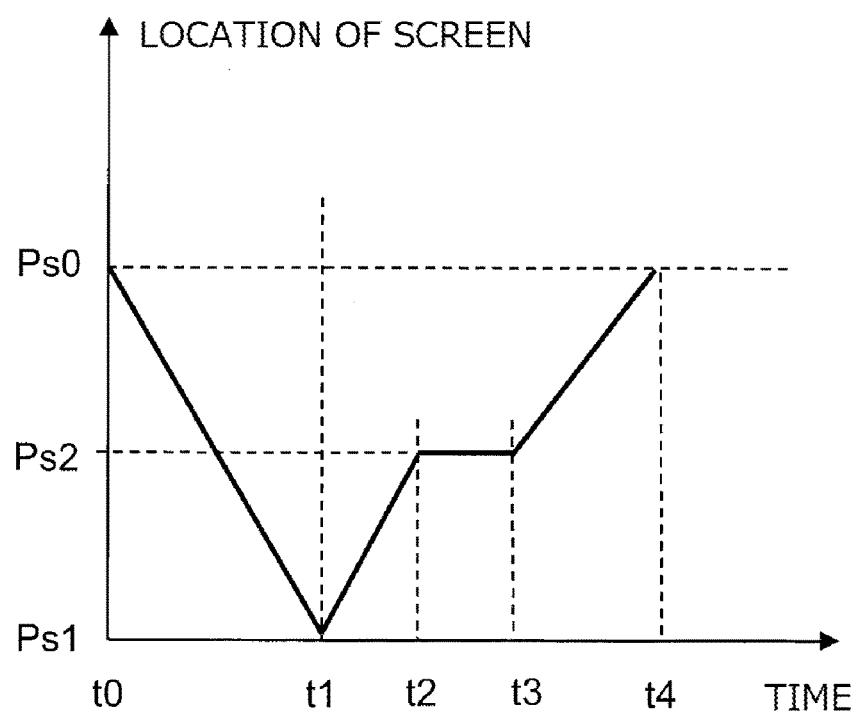
FIG. 5B is an exemplary graph relating to driving of the movable screen according to the first exemplary embodiment.

FIG. 5A schematically illustrates movable range D1 of movable screen 301; FIG. 5B is an exemplary graph relating to driving of movable screen 301.

In this exemplary embodiment, as illustrated in FIG. 5A, fixed screen 302 is fixed on the positive sides of movable screen 301 along the respective Z and Y axes. More specifically, fixed screen 302 is positioned optically farther from light source 101 (scanning unit 106) than movable screen 301. In addition, fixed screen 302 is apart from movable screen 301 in a direction parallel to each short side of movable screen 301.

As movable screen 301 is disposed toward the negative side of the Z axis (toward scanning unit 106), image 30, or the virtual image, is displayed farther from eyes 2a of vehicle driver 2. Since fixed screen 302 is disposed closer to the positive side of the Z axis than movable screen 301, the image on fixed screen 302 is displayed closer to eyes 2a of vehicle driver 2 than the image on movable screen 301. On the other hand, since fixed screen 302 is not moved, the image on fixed screen 302 is displayed at a constant distance away from eyes 2a of vehicle driver 2.

FIG. 6 schematically illustrates an image display example generated from images on movable screen 301 and fixed screen 302.

In the example of FIG. 6, depth image M1 corresponds to the arrow with which a navigation function proposes in which direction vehicle driver 2 needs to turn vehicle 1 on street R1, and vertical image M2 corresponds to the mark for making vehicle driver 2 pay attention to pedestrian H1. For example, depth image M1 and vertical image M2 may be displayed with different colors.

The image generated from the images on movable screen 301 and fixed screen 302 is displayed in region S0, which contains upper region S1 and lower region S2. The image generated on movable screen 301 is displayed in upper region S1, and the image generated on fixed screen 302 is displayed in lower region S2.

As illustrated in FIG. 6, images, including depth image M1 and vertical image M2, that dynamically change in relation to the driving are displayed in region S1. Static images, including a vehicle speed and an ambient temperature, are displayed in region S2. As described above, the image on fixed screen 302 is displayed on region S2 at a short distance (e.g., about 2 m) away from eyes 2a of vehicle driver 2. This distance is considerably shorter than the distance between vehicle driver 2 and his or her point of view (e.g., in the range of about several tens of meters to 100 m). Thus, the static images displayed in region S2 are less likely to affect a driving operation in a normal situation. In addition, the images displayed under region S0 are less likely to appear in the sight of vehicle driver 2. For this reason, it is believed that the static images displayed in region S2 do not affect a driving operation in a normal situation.

FIG. 5B is an exemplary graph relating to driving of movable screen 301 when a dynamic image, as illustrated in FIG. 6, is displayed in region S1.

Movable screen 301 repeats to move in cycles, each of which starts at time t0 and ends at time t4. Between time t0 and time t1, movable screen 301 moves from initial location Ps0 to farthest location Ps1. Then, between time t1 and time t4, movable screen 301 returns from farthest location Ps1 to initial location Ps0. One period over which movable screen 301 moves, or the period between time t0 and time t4, may be 1/60 seconds (60 Hz), for example. Screen driving circuit 204 feeds an electric current to the magnetic coil in conformity with the drive current profile that has been stored in memory 205 (see FIG. 2) in advance, thereby moving movable screen 301 in accordance with the graph of FIG. 5B.

During the period between time t0 and time t1, depth image M1, which is an image that spreads out into the depth, is displayed as illustrated in FIG. 6. During the period between time t1 and time t4, vertical image M2, which is an image that spreads out in a vertical direction, is displayed as illustrated in FIG. 6.

Between time t0 and time t1, movable screen 301 moves in a substantially linear manner from initial location Ps0 to farthest location Ps1. In response to the movement of movable screen 301, a site at which the virtual image is displayed in front of windshield 12 is shifted forward. Therefore, when movable screen 301 is present at each site in the depth direction within depth image M1, laser light sources 101a, 101b, 101c emit light to scanning lines corresponding to depth image M1 at a timing corresponding to depth image M1. This makes it possible to display, as the virtual image, depth image M1 illustrated in FIG. 6 in region S1.

Since vertical image M2 does not change in the depth direction and spreads out only in a vertical direction, it is necessary to fix movable screen 301 at a location corresponding to vertical image M2 and generate a virtual image. Stop location Ps2 in FIG. 5B is a location of movable screen 301 corresponding to a depth site of vertical image M2. When returning from farthest location Ps1 to initial location Ps0, movable screen 301 stops at stop location Ps2 between time t2 and time t3. Meanwhile, laser light sources 101a, 101b, 101c emit light to scanning lines corresponding to vertical image M2 at a timing corresponding to vertical image M2. This makes it possible to display, as the virtual image, vertical image M2 illustrated in FIG. 6 in front of projection area 13 of windshield 12.

The above control is performed by image processing circuit 201 illustrated in FIG. 2. This control causes depth image M1 and vertical image M2 to be displayed, as virtual images, in region S1 between time t0 and time t4. Under the control, depth image M1 and vertical image M2 may be displayed at different timings. However, since this timing difference is sufficiently small, vehicle driver 2 can visually perceive both depth image M1 and vertical image M2 that overlap each other. Consequently, it is possible for vehicle driver 2 to see images based on the image signal (depth image M1 and vertical image M2) while these images are overlapping a landscape including street R1 and pedestrian H1.

Since single vertical image M2 is displayed in the example of FIG. 6, single stop location Ps2 is set for movable screen 301 at the step in FIG. 5B. However, if a plurality of vertical images M2 are displayed, a plurality of stop locations may be set at the step in FIG. 5B. In this case, it should be noted that time t4 is fixed and the period between time t0 and time t4 is constant at the step of FIG. 5B. Depending on the number of stop locations, therefore, a moving speed of movable screen 301 (the gradient of the waveform in FIG. 5B) in the vicinity of each stop location needs to be set.

To display depth image M1 and vertical image M2 as illustrated in FIG. 6, it is necessary to move movable screen 301 at a high frequency, such as about 60 Hz. By providing fixed screen 302 in the configuration of this exemplary embodiment as illustrated in FIG. 5A, movable range D1 of movable screen 301 can be greatly narrowed.

When screen driving mechanism 300 illustrated in FIG. 3 drives movable screen 301, the equation of motion described below is satisfied;

$$F = ma + cv + kx = Kt * I,$$

where: F denotes a thrust (N) required to drive a moving part, which is movable screen 301, holder 303 holding movable screen 301, and the magnetic coil (not illustrated) supported in holder 303; m denotes a mass (kg) of the moving part, which is movable screen 301, holder 303 holding movable screen 301, and the magnetic coil supported in holder 303 (hereinafter just referred as "moving part"); a denotes an acceleration (m/s$^2$) of the moving part; c denotes a viscosity coefficient (Ns/m) of the moving part; v denotes a velocity (m/s) of the moving part; k denotes a spring constant (N/m) of each suspension 305; x denotes a displacement (m) of the moving part; Kt denotes a thrust constant (N/A) of screen driving mechanism 300; and I denotes a drive current (A) of screen driving mechanism 300.

Figure 7:
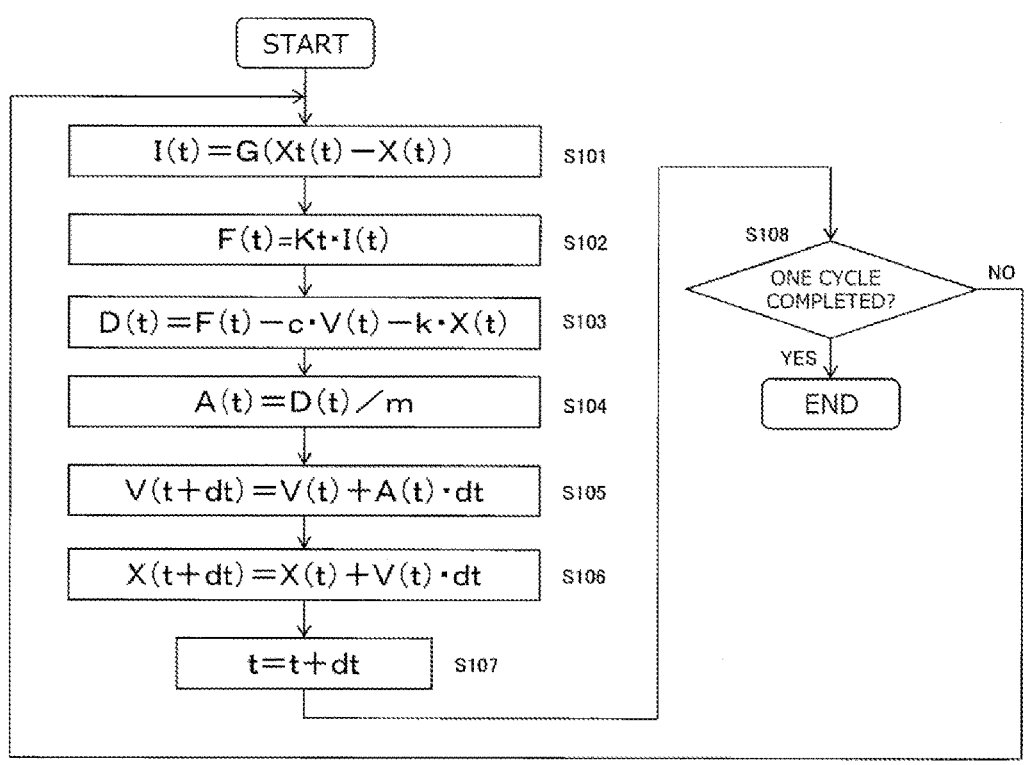
FIG. 7 is a flowchart illustrating an algorithm for generating current waveform data according to the first exemplary embodiment.

In this exemplary embodiment, drive waveform data for use in driving movable screen 301 is generated using an algorithm including Stages [1] to [8] described below. To help an understanding, details of the algorithm will be described with reference to the flowchart of FIG. 7.

Stage [1]

Figure 8A:
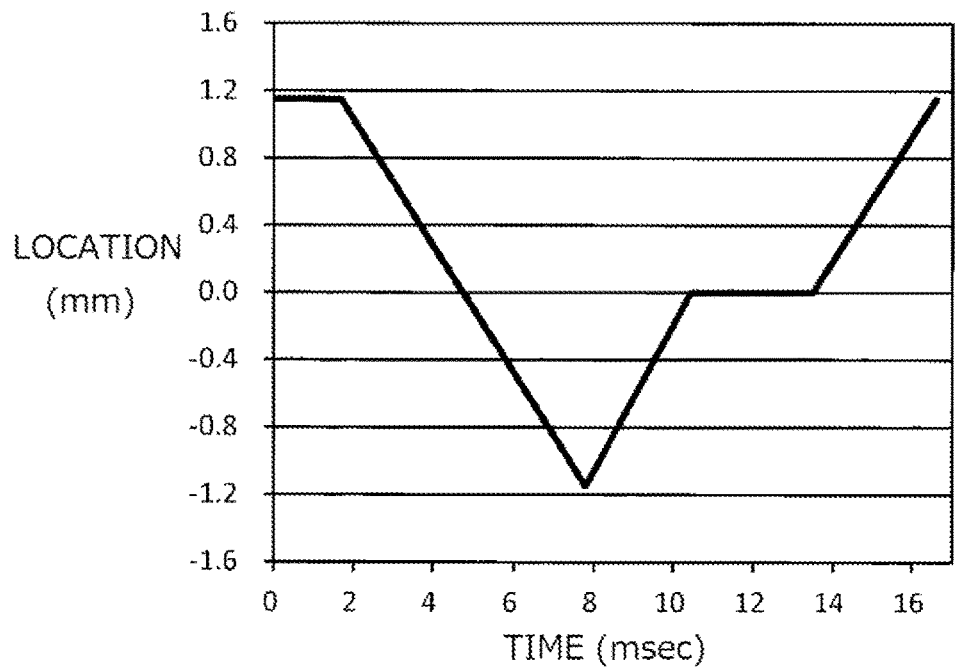
FIG. 8A is a graph of an exemplary movement profile for the movable screen.

Drive current profiles are prepared. These drive current profiles are used to generate a movement profile used as a target for moving movable screen 301. For example, the movement profile in this exemplary embodiment may be expressed as a waveform as illustrated in FIG. 8A. As illustrated in FIG. 8A, movable screen 301 can move in the range from about −1.2 mm to about +1.2 mm. In other words, movable screen 301 can move between a first site that is about 1.2 mm away from a site 0.0 mm toward the positive side of the Z axis and a second site that is about 1.2 mm away from the site 0.0 mm toward the negative side of the Z axis in FIG. 5A. The site 0.0 mm corresponds to a neutral location at which movable screen 301 in an unactuated state is positioned.

As described above, movable screen 301 can move in the range of about ±1.2 mm with respect to the neutral location (site 0.0 mm) in conformity with the movement profile illustrated in FIG. 8A. A reason why movable screen 301 moves in both the positive and negative directions along the Z axis is to reduce the risk of screen driving mechanism 300 operating under a heavy mechanical load. If movable screen 301 moves only in one direction, such as the negative or positive direction along the Z axis, from the neutral location, screen driving mechanism 300 needs to move movable screen 301 by a long distance, in which case a heavy load may be placed on screen driving mechanism 300 or screen driving circuit 204.

Figure 8B:
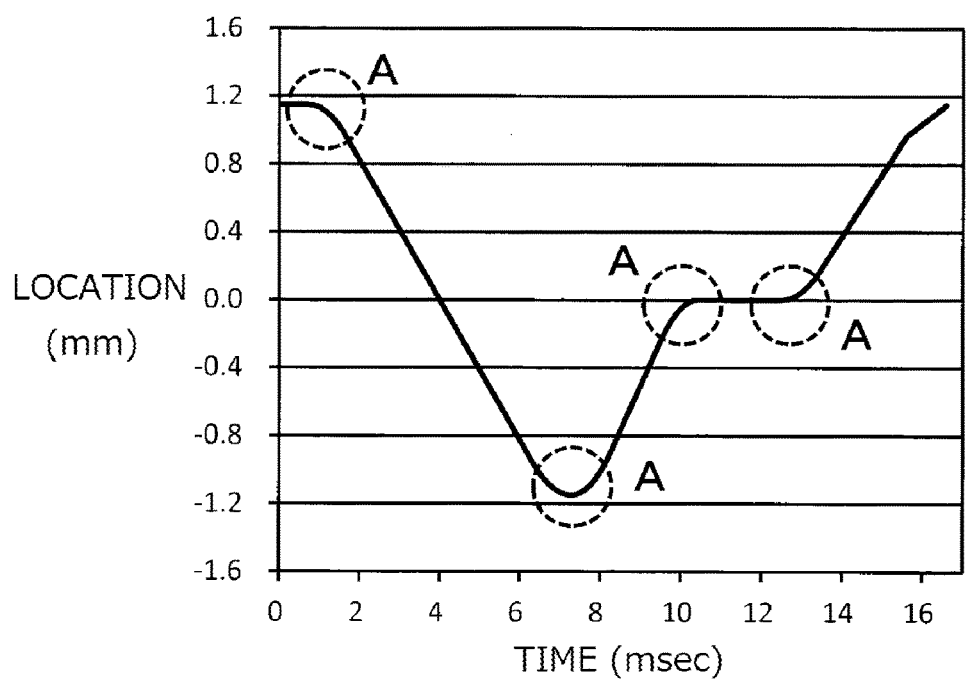
FIG. 8B is a graph of an exemplary movement profile that is obtained by smoothing the movement profile of FIG. 8A with a simple moving average method.

The movement profile illustrated in FIG. 8A is smoothed by a simple moving average method. The smoothed movement profile is illustrated in FIG. 8B. A smoothing method is not limited to the simple moving average method; alternatively, a weighted moving average method and any other methods may be employed.

As a result of the smoothing of the movement profile used as a target for moving movable screen 301, movable screen 301 moves without involving rapid speed variations. This leads to a stable control of a movement of movable screen 301. By changing the movement profile illustrated in FIG. 8A into the smoothed movement profile illustrated in FIG. 8B having regions A, for example, stability of the movement of movable screen 301 is improved, especially when movable screen 301 transits from a motion state to a stop state or from a stop state to a motion state.

The movement profile may be smoothed by a simple moving average method or a weighted moving average method. Employing these methods can generate a smoothed movement profile with ease.

Stage [2]

After the movement profile used as a target for moving movable screen 301 has been prepared, a drive current [I(t)] from screen driving mechanism 300 is calculated using a present location [X(t)] of movable screen 301 and a target location [Xt(t)] in the movement profile at a time (t). Then, a drive current ([I(t)]=[G(Xt(t)−X(t)]) from screen driving mechanism 300 at a time (t) is calculated (S101).

Stage [3]

A thrust ([F(t)]=[Kt*I(t)]) generated by the magnetic circuit in screen driving mechanism 300 at a time (t) is calculated using the drive current [I(t)] from screen driving mechanism 300 which has been calculated at Stage [2] (S102). This calculation may be made through the equation of motion established when the moving part, which is movable screen 301, holder 303 (see FIG. 3) holding movable screen 301, and the magnetic coil supported in holder 303, (hereinafter referred to as "moving part") is driven. In the above equation, Kt denotes a thrust constant of screen driving mechanism 300, which is determined from calculating a power generated per ampere of screen driving mechanism 300.

Stage [4]

Using the thrust [F(t)] generated by the magnetic circuit in screen driving mechanism 300 which has been calculated at Stage [3], a drive power ([D(t)]=[F(t)−c*V(t)−k*X(t)]) produced by screen driving mechanism 300, which is conducive to an acceleration of the moving part, is calculated (S103). In this above equation, c denotes a viscosity coefficient of the moving part, which may be determined experimentally. In one exemplary experimental method, the viscosity coefficient may be determined from a Q value of a frequency response characteristic graph at the resonance point in which the horizontal axis represents a frequency and the vertical axis represents a gain. Furthermore, V(t) denotes a velocity of the moving part at a time (t), which typically becomes 0 at time (0), and k denotes a spring constant of each suspension 305 (see FIG. 3) that elastically supports the moving part, which may be determined experimentally. In one exemplary experimental method, the spring constant may be determined from a displacement of the moving part when a load is placed on the moving part. In the above equation, X(t) denotes a present location of movable screen 301 at a time (t).

Stage [5]

Using the drive power [D(t)] produced by screen driving mechanism 300 which is conducive to an acceleration of the moving part which has been calculated at Stage [4], an acceleration ([A(t)]=[D(t)/m]) of the moving part at a time (t) is calculated (S104). In this equation, m denotes a mass of the moving part.

Stage [6]

Using the acceleration [A(t)] of the moving part at a time (t) which has been calculated at Step [5], a velocity ([V(t+dt)]=[V(t)+A(t)*dt]) of the moving part after the elapse of a unit of time is calculated (S105). In this equation, dt denotes a unit of time, and V(t) denotes a velocity of the moving part at a time (t).

Stage [7]

A location ([X(t+dt)]=[X(t)+V(t)*dt]) of the moving part after the elapse of a unit of time is calculated (S106). In this equation, dt denotes a unit of time, X(t) denotes a present location of movable screen 301, and V(t) denotes a velocity of the moving part at a time (t).

Stage [8]

To continuously determine a velocity [V(t+dt)] and location [X(t+dt)] of the moving part after the elapse of a unit of time, a unit of time (dt) is added to a current time (t) (S107). In this exemplary embodiment, the unit of time [(dt)] may be set to 1 μsec.

The calculation from Stages [2] to [8] is repeatedly performed for each cycle over which movable screen 301 moves, namely, for each cycle that starts at time t0 and ends at time t4 illustrated in FIG. 5B (S108). In this way, it is possible to determine a drive current I(t), acceleration A(t), velocity V(t), and location X(t) of the moving part at a time (t). Since movable screen 301 is driven at a frequency of about 60 Hz in this exemplary embodiment, one drive cycle of movable screen 301 is about 16.6 msec.

By repeating Stages [2] to [8] of the algorithm in the above manner, an equation model of a control target which is generated based on a motional property of screen driving mechanism 300 is calculated. Then, information on a waveform of a screen drive current which is used to cause movable screen 301 to follow a movement profile used as a target is calculated. In other words, screen driving waveform information for use in driving movable screen 301 is calculated. This screen driving waveform information is stored in memory 205 (see FIG. 2) during assembly. When image display device 20 operates, screen driving circuit 204 reads the screen driving waveform information from memory 205 and drives movable screen 301. In this way, by using the information on a waveform of a screen drive current for use in driving movable screen 301 as the screen driving waveform information, driving of screen driving mechanism 300 can be controlled with ease by screen driving circuit 204.

Constituent elements of screen driving mechanism 300 are holder 303 (see FIG. 3) that movably holds movable screen 301, the magnetic coil (not illustrated) supported by holder 303, and suspensions 305 that movably support holder 303. In this case, screen driving mechanism 300 is constituted by a minimal number of constituent elements. Thus, this configuration further helps screen driving circuit 204 (see FIG. 2) to control driving of screen driving mechanism 300.

Figure 9:
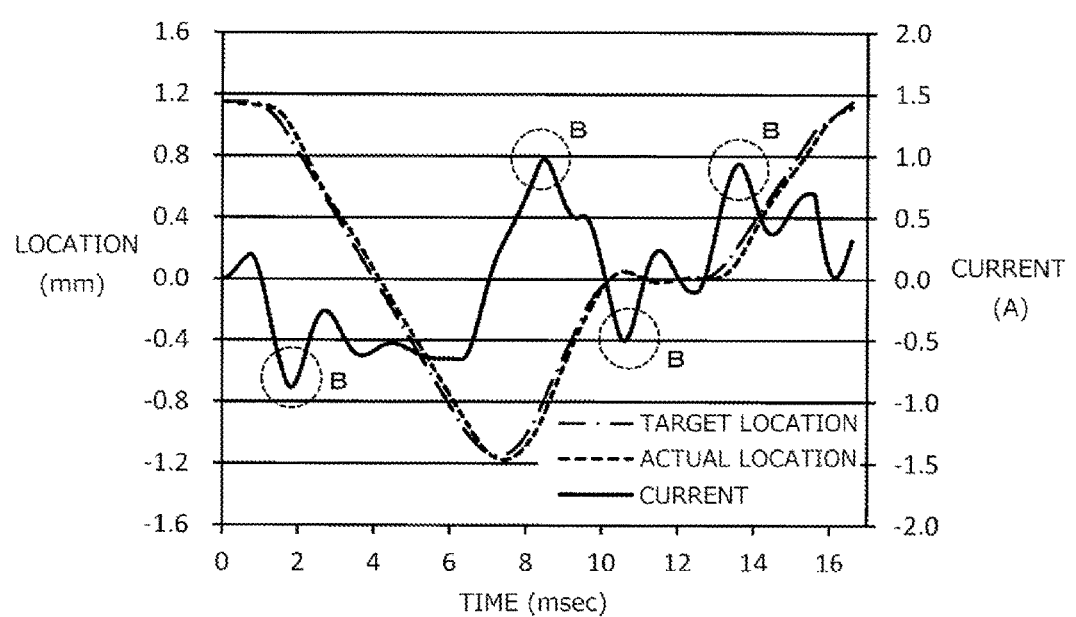
FIG. 9 is a graph indicating a relationship between a target location and actual location of the movable screen according to the first exemplary embodiment in relation to its drive current.
Figure 10:
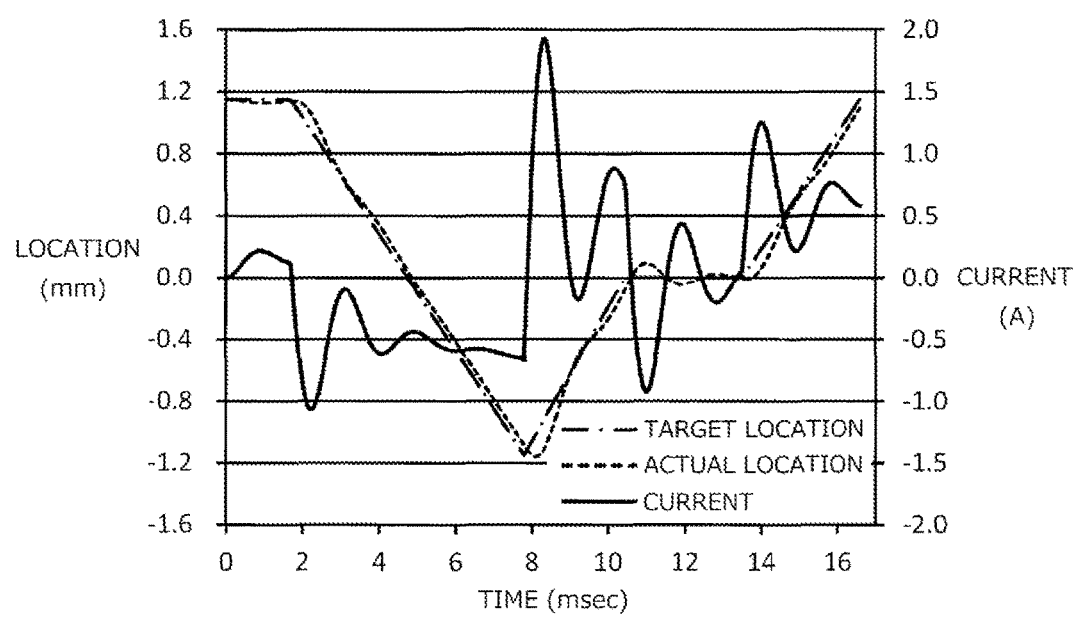
FIG. 10 is a graph indicating a relationship between a target location and actual location of a movable screen according to Comparative Example in relation to its drive current.

FIG. 9 illustrates a state in which movable screen 301 is driven with the information on a waveform of a screen drive current that has been calculated in the above manner. Specifically, in the state of FIG. 9, movable screen 301 moves in conformity with a smoothed movement profile; the smoothed movement profile is obtained by smoothing a movement profile used as a target for moving movable screen 301 so as to make its moving speed vary gently. FIG. 10 illustrates a state in which movable screen 301 in Comparative Example moves in conformity with an unsmoothed movement profile used as a target for moving movable screen 301. In FIGS. 9 and 10, the solid line represents a current waveform, the alternate long and short dashed line represents a target location of movable screen 301, and the broken line represents an actual location of movable screen 301. As can be seen from FIG. 9, movable screen 301 in this exemplary embodiment is driven with a smaller amount of drive current. Thus, this exemplary embodiment is effective in reducing a drive current, especially when movable screen 301 transits from a motion state to a stop state or from a stop state to a motion state, as in regions B of FIG. 9.

If image display device 20 employs a circuit that drives movable screen 301 with a voltage waveform instead of a current waveform, information on a waveform of a screen drive voltage can be determined from an equation described below, $$E(t)=L*dI(t)/dt+R*I(t)+Kt*V(t),$$

where: L denotes an inductance (H) of a coil; dI(t) denotes a current increment (A); dt denotes a unit of time (s); R denotes a coil resistance (Ω) of screen driving mechanism 300; I(t) denotes an electric current (A) fed to screen driving mechanism 300; Kt denotes a thrust constant (N/A) of screen driving mechanism 300; and V(t) denotes a velocity (m/s) of screen driving mechanism 300.

The information on a waveform of a screen drive voltage determined in the above manner, namely, screen driving waveform information for use in driving movable screen 301 is stored in memory 205 (see FIG. 2) in advance during assembly, similar to the information on a waveform of a screen drive current. Then, when image display device 20 operates, screen driving circuit 204 reads the screen driving waveform information from memory 205 and drives movable screen 301. In this way, by using the information on a waveform of a screen drive voltage for driving movable screen 301 as the screen driving waveform information, driving of screen driving mechanism 300 can be controlled with ease by screen driving circuit 204.

Figure 11:
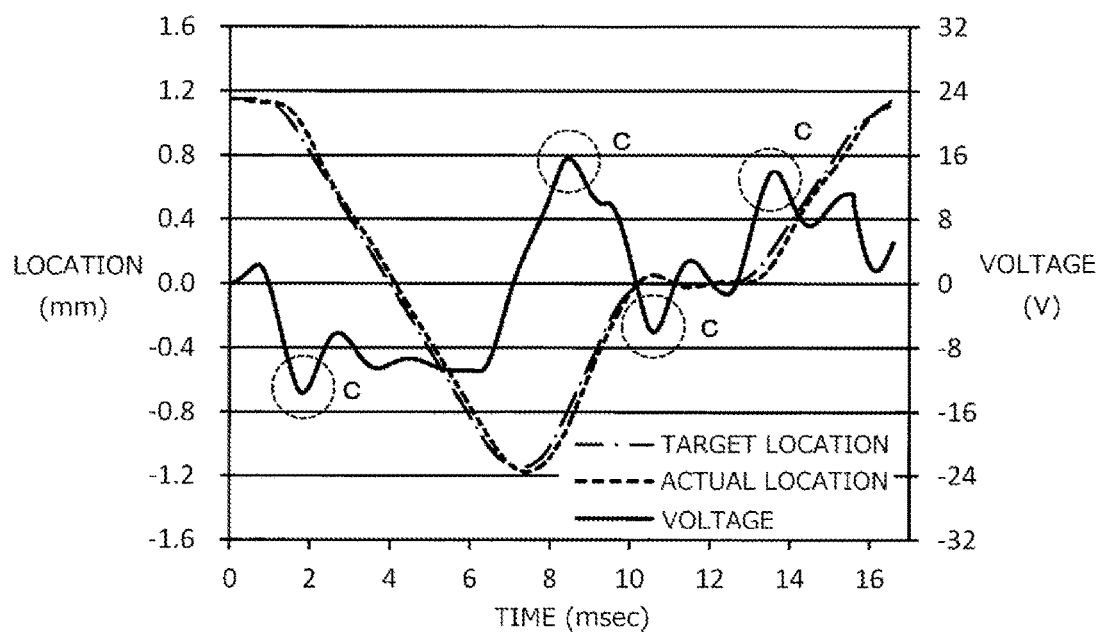
FIG. 11 is a graph indicating a relationship between a target location and actual location of the movable screen according to the first exemplary embodiment in relation to its drive voltage.
Figure 12:
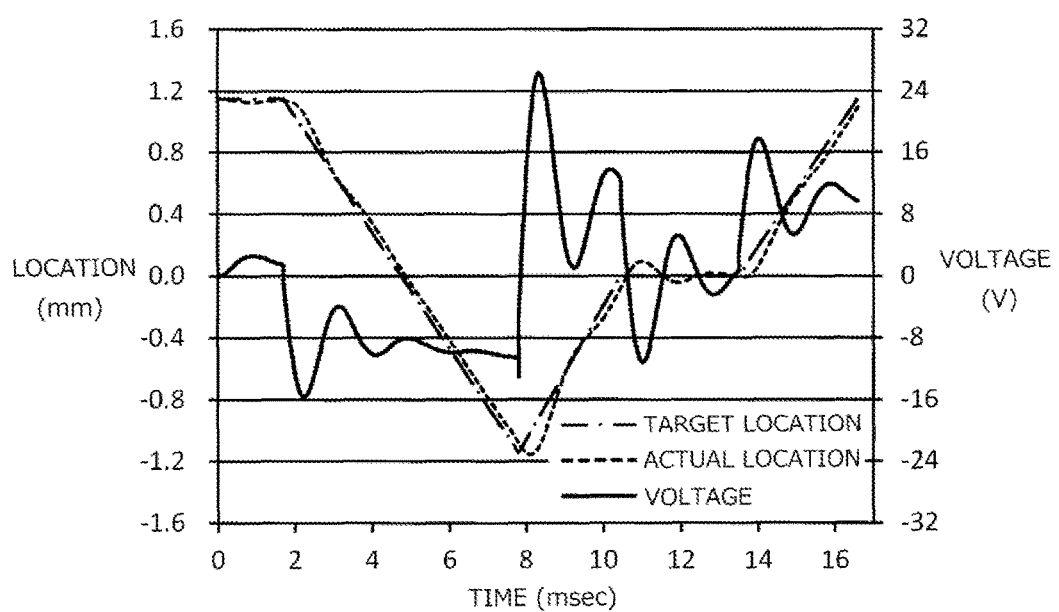
FIG. 12 is a graph indicating a relationship between a target location and actual location of a movable screen according to Comparative Example in relation to its drive voltage.

FIG. 11 illustrates a state in which movable screen 301 is driven with the information on a waveform of a screen drive voltage which has been determined using the above algorithm. Specifically, in the state of FIG. 11, movable screen 301 moves in conformity with a smoothed movement profile; the smoothed movement profile is obtained by smoothing a movement profile used as a target for moving movable screen 301 so as to make its moving speed vary gently. FIG. 12 illustrates a state in which movable screen 301 in Comparative Example moves in conformity with an unsmoothed movement profile used as a target for moving movable screen 301. In FIGS. 11 and 12, the solid line represents a voltage waveform, the alternate long and short dashed line represents a target location of movable screen 301, and the broken line represents an actual location of movable screen 301. As can be seen from FIG. 11, movable screen 301 in this exemplary embodiment is driven with a lower drive voltage. Thus, this exemplary embodiment is effective, especially when movable screen 301 transits from a motion state to a stop state or from a stop state to a motion state, as in regions C of FIG. 11.

In some conventional image display devices, when reciprocating at a high speed, a movable screen transits rapidly from a stop state to a motion state or from a motion state to a stop state on both sides of its moving range. In response to the rapid transition of movable screen 301 on both sides of the moving range, a large amount of drive current is fed to a screen driving mechanism. This may cause an unstable control of a movable screen.

Image display device 20 in this exemplary embodiment includes memory 205 in which screen driving waveform information is stored. The screen driving waveform information is generated such that movable screen 301 follows a smoothed movement profile. The smoothed movement profile is obtained by smoothing a movement profile used as a target for moving movable screen 301 so as to make a moving speed of movable screen 301 vary gently. Then, screen driving circuit 204 drives screen driving mechanism 300, based on the screen driving waveform information stored in memory 205. In which case, movable screen 301 can be driven with a small amount of drive current or low drive voltage. This enables movable screen 301 to move with stability. Consequently, screen driving mechanism 300 can move movable screen 301 with great stability, especially when movable screen 301 transits from a motion state to a stop state or from a stop state to a motion state.

Second Exemplary Embodiment

A second exemplary embodiment differs from the foregoing first exemplary embodiment in an algorithm used to generate drive waveform data regarding driving of movable screen 301. Other configurations of the second exemplary embodiment are substantially the same as in the first exemplary embodiment. The configurations of the second exemplary embodiment which are substantially the same as in the first exemplary embodiment are described in the identical drawings and denoted by the identical reference characters and will not described accordingly. Hereinafter, a description will be given of an algorithm used to generate drive waveform data in the second exemplary embodiment.

In this exemplary embodiment, drive waveform data for use in driving movable screen 301 is generated using an algorithm having Stages [1] to [8] described below. To help an understanding, details of the algorithm will be described with reference to the flowchart of FIG. 7.

Stage [1]

Figure 13:
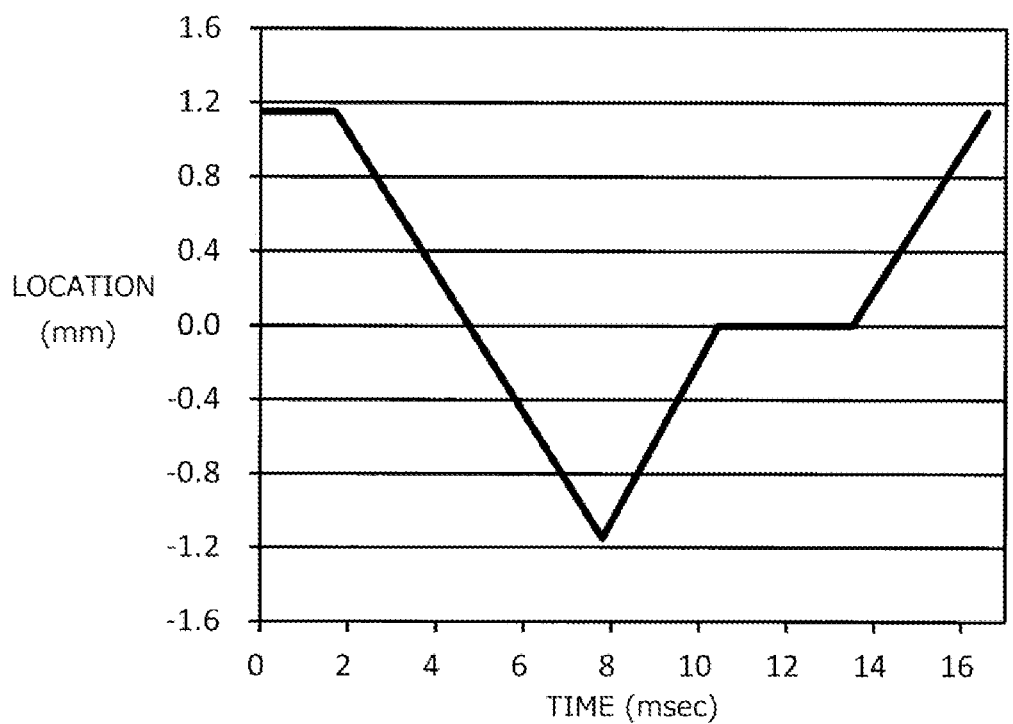
FIG. 13 is a graph of an exemplary movement profile for a movable screen according to a second exemplary embodiment.

Drive current profiles are prepared. These drive current profiles are used to generate a movement profile used as a target for moving movable screen 301. For example, the movement profile in this exemplary embodiment may be expressed as a waveform as illustrated in FIG. 13. As illustrated in FIG. 13, movable screen 301 can move in the range from about −1.2 mm to about +1.2 mm. In other words, movable screen 301 can move between a first site that is about 1.2 mm away from a site 0.0 mm toward the positive side of the Z axis and a second site that is about 1.2 mm away from the site 0.0 mm toward the negative side of the Z axis in FIG. 5A. The site 0.0 mm corresponds to a neutral location at which movable screen 301 in an unactuated state is positioned.

As described above, movable screen 301 can move in the range of about ±1.2 mm with respect to the neutral location (site 0.0 mm) in conformity with the movement profile illustrated in FIG. 13. A reason why movable screen 301 moves in both the positive and negative directions along the Z axis is to reduce the risk of screen driving mechanism 300 operating under a heavy mechanical load. If movable screen 301 moves only in one direction, such as the negative or positive direction along the Z axis, from the neutral location, screen driving mechanism 300 needs to move movable screen 301 by a long distance, in which case a heavy load may be placed on screen driving mechanism 300.

Stage [2]

First, a movement profile used as a target for moving movable screen 301 is prepared, and then a drive current [I(t)] from screen driving mechanism 300 is calculated using a present location [X(t)] of movable screen 301 and a target location [Xt(t)] in the movement profile at a time (t) (S101).

Stage [3]

A thrust ([F(t)]=[Kt*I(t)]) generated by the magnetic circuit in screen driving mechanism 300 at a time (t) is calculated using the drive current [I(t)] from screen driving mechanism 300 which has been calculated at Stage [2] (S102). This calculation may be made through the equation of motion established when the moving part, which is movable screen 301, holder 303 (see FIG. 3) holding movable screen 301, and the magnetic coil supported in holder 303 (hereinafter referred to as "moving part"), is driven. In the above equation, Kt denotes a thrust constant of screen driving mechanism 300, which is determined from calculating a power generated per ampere of screen driving mechanism 300.

Stage [4]

Using the thrust [F(t)] generated by the magnetic circuit in screen driving mechanism 300 which has been calculated at Stage [3], a drive power ([D(t)]=[F(t)−c*V(t)−k*X(t)]) produced by screen driving mechanism 300, which is conducive to an acceleration of the moving part, is calculated (S103). In this above equation, c denotes a viscosity coefficient of the moving part, which may be determined experimentally. In one exemplary experimental method, the viscosity coefficient may be determined from a Q value of a frequency response characteristic graph at the resonance point in which the horizontal axis represents a frequency and the vertical axis represents a gain. Furthermore, V(t) denotes a velocity of the moving part at a time (t), which typically becomes 0 at time (0), and k denotes a spring constant of each suspension 305 (see FIG. 3) that elastically supports the moving part, which may be determined experimentally. In one exemplary experimental method, the spring constant may be determined from a displacement of the moving part when a load is placed on the moving part. In the above equation, X(t) denotes a present location of movable screen 301 at a time (t).

Stage [5]

Using the drive power [D(t)] produced by screen driving mechanism 300 which is conducive to an acceleration of the moving part which has been calculated at Stage [4], an acceleration ([A(t)]=[D(t)/m]) of the moving part at a time (t) is calculated (S104). In this equation, m denotes a mass of the moving part.

Stage [6]

Using the acceleration [A(t)] of the moving part at a time (t) which has been calculated at Step [5], a velocity ([V(t+dt)]=[V(t)+A(t)*dt]) of the moving part after the elapse of a unit of time is calculated (S105). In this equation, dt denotes a unit of time, and V(t) denotes a velocity of the moving part at a time (t).

Stage [7]

A location ([X(t+dt)]=[X(t)+V(t)*dt]) of the moving part after the elapse of a unit of time is calculated (S106). In this equation, dt denotes a unit of time, X(t) denotes a present location of movable screen 301, and V(t) denotes a velocity of the moving part at a time (t).

Stage [8]

To continuously determine a velocity [V(t+dt)] and location [X(t+dt)] of the moving part after the elapse of a unit of time, a unit of time (dt) is added to a current time (t) (S107). In this exemplary embodiment, the unit of time [(dt)] is set to 1 µsec.

The calculation from Stages [2] to [8] is repeatedly performed for each cycle over which movable screen 301 moves, namely, for each cycle that starts at time t0 and ends at time t4 illustrated in FIG. 5B (S108). In this way, it is possible to determine a drive current I(t), acceleration A(t), velocity V(t), and location X(t) of the moving part at a time (t). Since movable screen 301 is driven at a frequency of about 60 Hz in this exemplary embodiment, one drive cycle of movable screen 301 is about 16.6 msec.

By repeating Stages [2] to [8] of the algorithm in the above manner, an equation model of a control target which is generated based on a motional property of screen driving mechanism 300 is calculated. Then, information on a waveform of a screen drive current which is used to cause movable screen 301 to follow a movement profile used as a target is calculated. In other words, screen driving waveform information for use in driving movable screen 301 is calculated. This screen driving waveform information is stored in memory 205 (see FIG. 2) in advance during assembly. When image display device 20 operates, screen driving circuit 204 reads the screen driving waveform information from memory 205 and drives movable screen 301. In this way, by using the information on a waveform of a screen drive current for driving movable screen 301 as the screen driving waveform information, driving of screen driving mechanism 300 can be controlled with ease by screen driving circuit 204 (see FIG. 2).

Constituent elements of screen driving mechanism 300 are holder 303 that movably holds movable screen 301, the magnetic coil (not illustrated) supported by holder 303, and suspensions 305 that movably support holder 303. In this case, screen driving mechanism 300 is constituted by a minimal number of constituent elements. Thus, this configuration helps image processing circuit 201 to control screen driving circuit 204.

Figure 14:
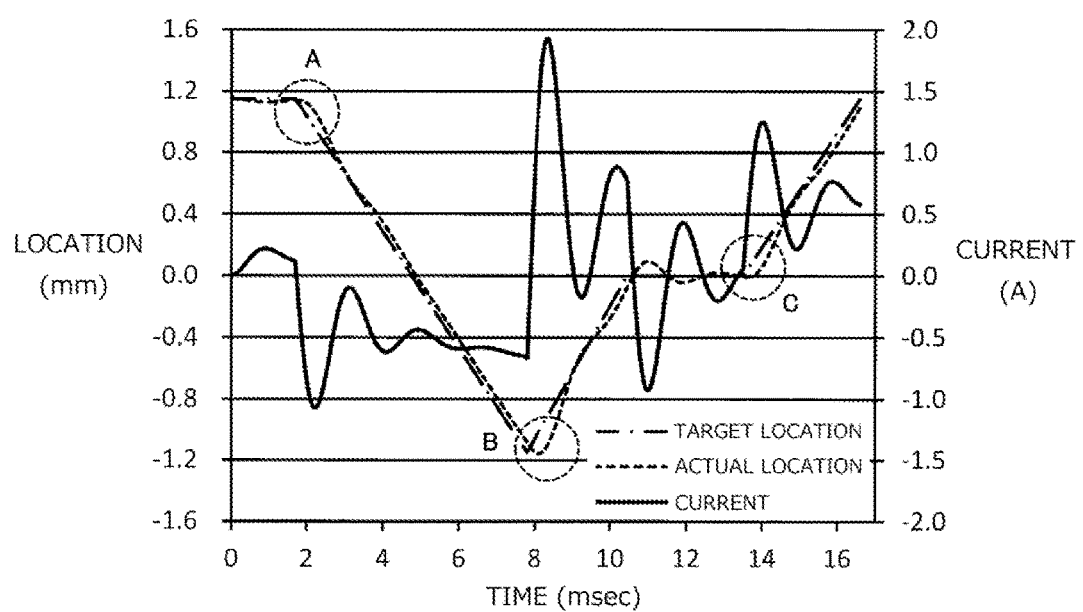
FIG. 14 is a graph indicating a relationship between a target location and actual location of the movable screen according to the second exemplary embodiment in relation to its drive current.

FIG. 14 is a graph relating to a state in which movable screen 301 moves in conformity with the information on a waveform of a screen drive current calculated in the above manner. In this graph, the solid line represents a current waveform, the long and short dashed line represents a target location of movable screen 301, and the broken line represents an actual location of movable screen 301. The graph demonstrates that movable screen 301 is driven with its location closely approximated to the target location.

If image display device 20 employs a circuit that drives movable screen 301 with a voltage waveform instead of a current waveform, information on a waveform of a screen drive voltage can be determined from an equation described below, $$E(t)=L*dI(t)/dt+R*I(t)+Kt*V(t),$$

where: L denotes an inductance (H) of a coil; dI(t) denotes a current increment (A); dt denotes a unit of time (s); R denotes a coil resistance (Ω) of screen driving mechanism 300; I(t) denotes an electric current (A) fed to screen driving mechanism 300; Kt denotes a thrust constant of screen driving mechanism 300; and V(t) denotes a velocity (m/s) of screen driving mechanism 300.

The information on a waveform of a screen drive voltage determined in the above manner, namely, screen driving waveform information for use in driving movable screen 301 is stored in memory 205 (see FIG. 2) in advance during assembly, similar to the information on a waveform of a screen drive current. Then, when image display device 20 operates, screen drive circuit 204 reads the screen driving waveform information from memory 205 and drives movable screen 301. In this way, by using the information on a waveform of a screen drive voltage for driving movable screen 301 as the screen driving waveform information, driving of screen driving mechanism 300 can be controlled with ease by screen driving circuit 204.

Figure 15:
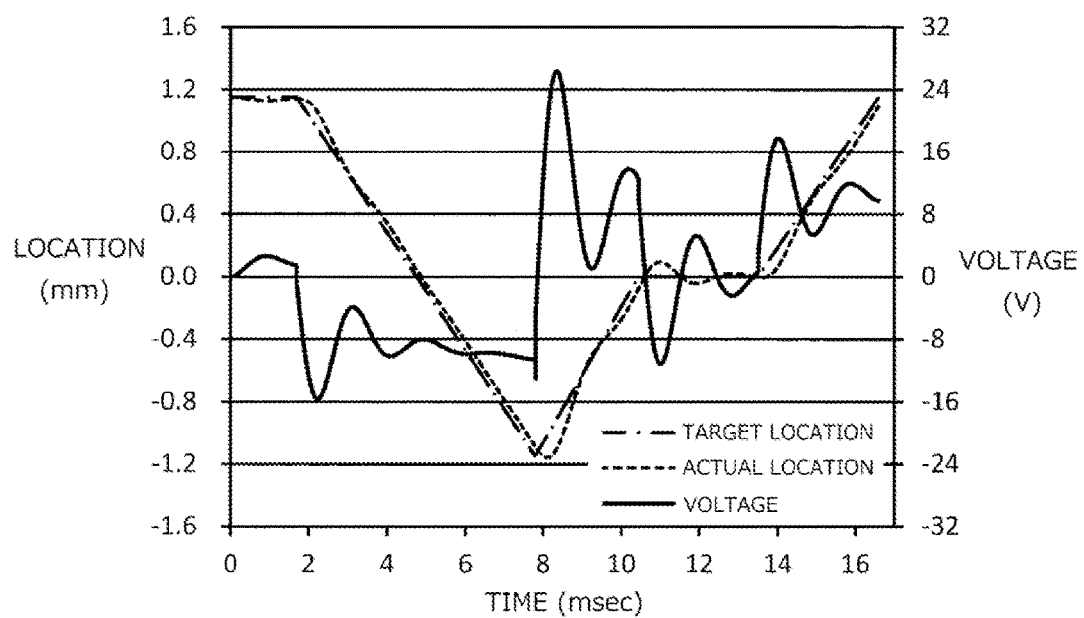
FIG. 15 is a graph indicating a relationship between a target location and actual location of the movable screen according to the second exemplary embodiment in relation to its drive voltage.

FIG. 15 is a graph relating to a state in which movable screen 301 moves in conformity with the information on a waveform of a screen drive voltage calculated using the above algorithm. In this graph, the solid line represents a voltage waveform, the long and short dashed line represents a target location of movable screen 301, and the broken line represents an actual location of movable screen 301. The graph demonstrates that movable screen 301 is driven with its location closely approximated to the target location.

Some conventional image display devices control, in an open-loop manner, screen driving mechanism 300 that moves movable screen 301. To make an actual movement of the movable screen 301 to accurately follow target values of a movement profile, a manufacturer needs to manually adjust the number of drive pulses and a moving direction of a screen during the fabrication while monitoring both a location of movable screen 301 and an operation of screen driving circuit 204 which drives screen driving mechanism 300. However, there may be difficulty in making an actual movement of movable screen 301 to accurately follow target values of a movement profile.

Image display device 20 in this exemplary embodiment includes memory 205 in which screen driving waveform information is stored. The screen driving waveform information is generated such that movable screen 301 follows a movement profile used as a target for moving movable screen 301. Then, screen driving circuit 204 drives screen driving mechanism 300, based on the screen driving waveform information stored in memory 205. This makes it possible to make an actual movement of movable screen 301 to accurately follow target values of the movement profile. Furthermore, screen driving waveform information is generated in consideration of motional property that differs according to a structure of individual screen driving mechanism 300, and image display device 20 drives screen driving mechanism 300, based on the screen driving waveform information. An actual movement of movable screen 301 thereby can be approximated to target values of the movement profile in a short time. Consequently, it is possible to make an actual movement of movable screen 301 in an optical axis direction of light emitted from a light source to accurately follow target values of the movement profile in a short time.

Exemplary embodiments of the present disclosure can be modified as appropriate within the scope of the technical idea in the claims.

The present disclosure makes it possible to control a movement of a screen even at a high speed with stability and to make an actual movement of the screen in an optical axis direction of light emitted from a light source to accurately follow target values of a movement profile. Therefore, the present disclosure is applicable to image display devices to be mounted in vehicles and other movable bodies.

What is claimed is:

1. An image display device comprising:
a light source;
a screen which is irradiated with light from the light source to form an image;
an optical system that generates a virtual image with the light from the screen;
a screen driving mechanism unit that moves the screen in an optical axis direction of the light emitted from the light source;
a memory unit in which screen driving waveform information is stored, the screen driving waveform information being generated such that the screen follows a smoothed movement profile, the smoothed movement profile being obtained by smoothing a movement profile so as to make a moving speed of the screen vary, the movement profile being used as a target for moving the screen; and
a screen driving circuit unit that drives the screen driving mechanism unit, based on the screen driving waveform information stored in the memory unit,
wherein the smoothed movement profile is obtained by smoothing the movement profile with a simple moving average method or a weighted moving average method.

2. The image display device according to claim 1, wherein the screen driving waveform information is current waveform information of a screen drive for use in driving the screen.

3. The image display device according to claim 1, wherein the screen driving waveform information is voltage waveform information of a screen drive for use in driving the screen.

4. The image display device according to claim 1, wherein the screen driving mechanism unit includes:
a holder unit that holds the screen;
a magnetic coil unit supported by the holder unit; and
a suspension unit that supports the holder unit so as to enable the holder unit to move in the optical axis direction.

5. An image display device comprising:
a light source;
a screen which is irradiated with light from the light source to form an image;
an optical system that generates a virtual image with the light from the screen;
a screen driving mechanism unit that moves the screen in an optical axis direction of the light emitted from the light source;
a memory unit in which screen driving waveform information is stored, the screen driving waveform information being generated such that the screen follows a movement profile, the movement profile being used as a target for moving the screen; and
a screen driving circuit unit that drives the screen driving mechanism unit, based on the screen driving waveform information stored in the memory unit,
wherein the screen driving waveform information is generated based on a motional property of the screen driving mechanism unit and is current waveform information of a screen drive for use in driving the screen.

6. The image display device according to claim 5, wherein the screen driving mechanism unit includes:
a holder unit that holds the screen;
a magnetic coil unit supported by the holder unit; and
a suspension unit that supports the holder unit so as to enable the holder unit to move in the optical axis direction.

7. An image display device comprising:
a light source;
a screen which is irradiated with light from the light source to form an image;
an optical system that generates a virtual image with the light from the screen;
a screen driving mechanism unit that moves the screen in an optical axis direction of the light emitted from the light source;
a memory unit in which screen driving waveform information is stored, the screen driving waveform information being generated such that the screen follows a movement profile, the movement profile being used as a target for moving the screen; and
a screen driving circuit unit that drives the screen driving mechanism unit, based on the screen driving waveform information stored in the memory unit,
wherein the screen driving waveform information is generated based on a motional property of the screen driving mechanism unit and is voltage waveform information of a screen drive for use in driving the screen.

8. The image display device according to claim 7, wherein the screen driving mechanism unit includes:
a holder unit that holds the screen;
a magnetic coil unit supported by the holder unit; and
a suspension unit that supports the holder unit so as to enable the holder unit to move in the optical axis direction.

* * * * *